(12) United States Patent
Mura et al.

(10) Patent No.: US 10,084,489 B2
(45) Date of Patent: Sep. 25, 2018

(54) MULTIPLE ANTENNA SYSTEM AND TRANSCEIVER FRONT END FOR INTERBAND DOWNLINK CARRIER AGGREGATION

(71) Applicant: Motorola Mobility LLC, Chicago, IL (US)

(72) Inventors: John Mura, Clarendon Hills, IL (US); Brian Bremer, Arlington Heights, IL (US); Abu Sayem, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 121 days.

(21) Appl. No.: 15/225,728

(22) Filed: Aug. 1, 2016

(65) Prior Publication Data

US 2018/0034152 A1    Feb. 1, 2018

(51) Int. Cl.
  *H01Q 3/24*    (2006.01)
  *H04B 1/00*    (2006.01)
  *H01Q 21/28*   (2006.01)
  *H04B 7/06*    (2006.01)
  *H04L 5/00*    (2006.01)

(52) U.S. Cl.
  CPC ............ *H04B 1/006* (2013.01); *H01Q 21/28* (2013.01); *H04B 7/0691* (2013.01); *H04L 5/001* (2013.01)

(58) Field of Classification Search
  CPC ....................................................... H01Q 3/24
  USPC ....................................................... 343/770
  See application file for complete search history.

(56) References Cited

U.S. PATENT DOCUMENTS

| | | | |
|---|---|---|---|
| 8,615,209 B1* | 12/2013 | Khlat | H04W 52/30 455/126 |
| 2013/0194158 A1* | 8/2013 | Chen | H01Q 1/50 343/876 |
| 2013/0285873 A1* | 10/2013 | Dupuy | H01Q 21/30 343/852 |

OTHER PUBLICATIONS

Koga, Yohei, et al., Mobile Handset Antenna Solution with Optimized Matching Circuits for Carrier Aggregation Operation, IEEE, 2013, pp. 107-110.

* cited by examiner

*Primary Examiner* — Huedung Mancuso
(74) *Attorney, Agent, or Firm* — Cygan Law Offices P.C.; Joseph T. Cygan

(57) ABSTRACT

A first antenna and a first band switch with a first duplexer operatively coupled to a first output of the first band switch. The first duplexer provides a transmit sub-band feed and a first receive sub-band feed for a first RF band. A second duplexer is operatively coupled to a second output of the first band switch, and provides a transmit sub-band feed and a first receive sub-band feed for a second RF band. A second antenna is operatively coupled to an input of a second band switch. A first antenna matching network for the second antenna is operatively coupled to a first output of the second band switch, and provides a second receive sub-band feed for the first RF band. A second antenna matching network is operatively coupled to a second output of the second band switch, and provides a second receive sub-band feed for the second RF band.

13 Claims, 5 Drawing Sheets

MULTIPLE ANTENNA SYSTEM AND TRANSCEIVER FRONT END FOR INTERBAND DOWNLINK CARRIER AGGREGATION

FIELD OF THE DISCLOSURE

The present disclosure relates generally to radio transceivers and antennas and more particularly to RF (radio frequency) front ends in radio transceivers that are capable of carrier aggregation.

BACKGROUND

LTE-Advanced (Long Term Evolution Advanced) wireless communications systems make use of carrier aggregation (CA) to increase bandwidth which in turn results in increased bitrates. Interband downlink (DL) CA requires radio reception in two or more radio receive (Rx) bands simultaneously while transmitting in one or the other of the two bands. These two or more Rx bands are at different frequencies. Depending on the frequency separation and configuration of the Rx bands, an antenna or antennas must be tuned with an RF (radio frequency) impedance matching network to resonate at the required frequencies.

In a mobile device, the maximum usable antenna bandwidth is determined by design constraints such as the physical size and structure of the antenna and the matching networks. In one known implementation, a single antenna is designed with sufficient bandwidth to accommodate both frequency bands including transmit (Tx) and Rx sub-bands at the same time with reasonable performance. In such single antenna implementations, the full desired bandwidth of the antenna cannot be met due to the limited size of the physical antenna. In addition, duplex filters for both bands must be combined through diplexing which has its own drawbacks in terms of additional insertion loss and bandwidth.

An example of such a known single antenna system 100 is shown in FIG. 1. A single antenna 101 that is designed for wide bandwidth is coupled to an antenna matching network 103 on the antenna feed. The antenna matching network 103 is connected to a band switch 107 through an RF test connector 105. The band switch 107 is operative to switch the antenna 101 to various band feeds to a transceiver 160. The example includes a band A & B feed 109, band X feed 123, and band Y feed 125, and a band Z feed 117. For LTE-Advanced operation, the band A & B feed 109 is used and one of the bands A or B may be used as a Primary Component Carrier (PCC) with the other of the bands being used as a Secondary Component Carrier (SCC).

The band A & B feed 109 is coupled to a quadplexer 111, which is high insertion loss diplexed duplex filters, for the two bands. The quadplexer 111 is coupled to a power amplifier (PA) 113 and low noise amplifier (LNA) 114 for the corresponding respective Tx and Rx connections for band A, and to a PA 115 and LNA 116 for the corresponding respective Tx and Rx connections for band B.

For operation without using CA, the band switch 107 may be switched to the band Z feed 117. The band Z feed 117 is coupled to a duplexer 119. The duplexer 119 is coupled to a PA 121 and an LNA 122 for the corresponding respective Tx and Rx connections for band Z. The band switch 107 may also switch to the band X feed 123, or to the band Y feed 125 for reception on those bands.

The primary drawback of the single antenna system 100, is that the antenna 101 cannot provide the full desired bandwidth to accommodate operation in all five bands, A, B, X, Y and Z, because of design constraints on antenna size. The antenna matching network 103 is also subject to design constraints and can only provide a certain amount of antenna operational improvement. Another drawback is the requirement of the quadplexer 111 to support PCC and SCC operation, because the quadplexer 111 has a high insertion loss.

In another known implementation, a second antenna can be dedicated to the second band all the time, which eliminates the need for the high insertion loss quadplexer and allows for antenna designs that are better matched to the desired bandwidths. An example of such a known two antenna system 200 is shown in FIG. 2. The example includes a band A feed 209, band X feed 215, band B feed 229, band Y feed 241, and a band Z feed 235.

A moderate bandwidth first antenna 201 has a corresponding antenna matching network 203 on the antenna feed and is operatively coupled to a band switch 207 through an RF test connector 205. The band switch 207 is operative to switch the first antenna 201 to band A feed 209 and band X feed 215. A moderate bandwidth second antenna 221 has a corresponding antenna matching network 223 on the antenna feed and is operatively coupled to a band switch 227 through an RF test connector 225. The band switch 227 is operative to switch the second antenna 221 to band B feed 229 and band Z feed 235. For LTE-Advanced operation, one of band A or band B is used as a PCC with the other of the bands being used as an SCC. In the two antenna system 200, the first antenna 201 is designed to cover the full transmit and receive bandwidths for band A and band X, while the second antenna 221 is designed to cover the full transmit and receive bandwidths for band B, band Y and band Z.

The band A feed 209 is coupled to a first duplexer 211, which is in turn coupled to a PA 213 and an LNA 214 for the corresponding respective Tx and Rx connections for band A. The band X feed 215 is coupled to a second duplexer 217, which is in turn coupled to a PA 219 and an LNA 220 for the corresponding respective Tx and Rx connections for band X. For the second antenna 221 transceiver front end, the band B feed 229 is coupled to a third duplexer 231, which is in turn coupled to a PA 233 and an LNA 234 for the corresponding respective Tx and Rx connections for band B. The band Z feed 235 is coupled to a fourth duplexer 237, which is in turn coupled to a PA 239 and an LNA 240 for the corresponding respective Tx and Rx connections for band Z. All of the PAs and LNAs are operatively coupled to a transceiver 260.

For operation without CA, one of the band switches must be switched to one of the desired bands A, X, B, Y, or Z for example where one antenna is used to receive and transmit in the desired band, but the other, second antenna, while physically present, is not being utilized at that instant. The second antenna, although not being used at that instant, is designed to support the bands assigned to that antenna and may have a natural response for all the bands it is designed to support. If the bands on the first antenna are close in frequency to the second antenna, there will be degraded antenna efficiency due to finite antenna coupling. This antenna coupling and efficiency degradation is made worse if the antenna switch on the second antenna is connected to the duplex filter that is close in frequency to the active band. Another drawback of the two antenna system 200 is that the antenna matching networks may still be complex. If band A and band B are relatively close to each other and band X, Y and Z are close to each other, then the antenna matching networks are similar and doubled compared to the single antenna system 100. It is desirable to reduce the complexity of one of the antenna matching networks, either antenna matching network 203 or antenna matching network 223.

DETAILED DESCRIPTION

Figure 1:
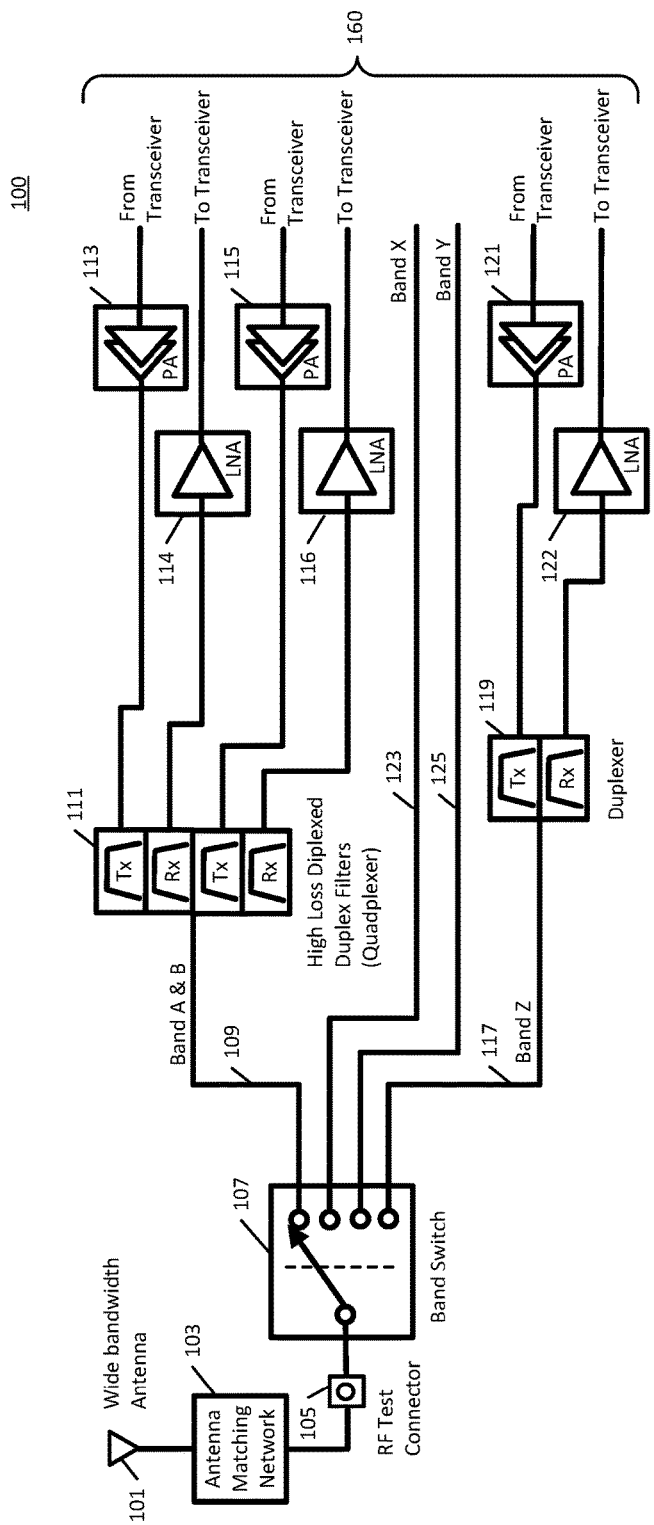
FIG. 1 is a block diagram of a known single antenna system having a corresponding transceiver front end that uses a single wide bandwidth antenna and dedicated antenna matching network.

Briefly, a two antenna system and corresponding transceiver front end is disclosed that reduces the antenna bandwidth requirements for implementation of interband downlink carrier aggregation (CA) pairs. The disclosed embodiments are particularly useful for radio frequency (RF) bands in the range of 600 to 900 MHz. The disclosed embodiments also provide advantages in overall design cost for implementing other CA combinations and reduced insertion loss in the transceiver front end thereby improving overall performance. Additionally, the narrow bandwidth requirements of the second antenna significantly reduces antenna to antenna coupling efficiency degradation.

An apparatus of a disclosed embodiment includes a first antenna that is operatively coupled to an input of a first band switch and a first duplexer operatively coupled to a first output of the first band switch. The first duplexer is operative to provide a transmit sub-band feed and a first receive sub-band feeds for a first RF band. A second duplexer is operatively coupled to a second output of the first band switch, and is operative to provide a transmit sub-band feed and a first receive sub-band feed for a second RF band. A second antenna is operatively coupled to an input of a second band switch. A first antenna matching network for the second antenna is operatively coupled to a first output of the second band switch, and is operative to provide a second receive sub-band feed for the first RF band. A second antenna matching network for the second antenna is operatively coupled to a second output of the second band switch, and is operative to provide a second receive sub-band feed for the second RF band.

The embodiment may further include a first bandpass filter operatively coupled to the first antenna matching network output, and tuned to the receive sub-band of the first RF band, and a second bandpass filter operatively coupled to the second antenna matching network output, and tuned to the receive sub-band of the second RF band.

The embodiments may include band switching control logic that is operatively coupled to the first band switch and to the second band switch. The band switching logic is operative to switch, using the first band switch, the first antenna to the first duplexer such that the first RF band is used as a primary component carrier. The band switching control logic is also operative to switch, using the second band switch, the second antenna to one of the first antenna matching network or the second antenna matching network such that one of the second receive sub-band feed for the first RF band, or the second receive sub-band feed for the second RF band, is used as a secondary component carrier feed during carrier aggregation with the first receive sub-band feed for the first RF band provided from the first duplexer.

The embodiments may further include band switching control logic, operatively coupled to the first band switch and to the second band switch. The band switching logic is operative to: switch, using the first band switch, the first antenna to the first duplexer such that the first RF band is used as a primary component carrier; and switch, using the second band switch, the second antenna to the second antenna matching network such that the second receive sub-band feed for the second RF band, is used as a secondary component carrier feed during interband carrier aggregation with the first receive sub-band feed for the first RF band provided from the first duplexer. The band switching control logic is also operative to switch, using the second band switch, the second antenna to the first antenna matching network such that the second receive sub-band feed for the first RF band is used as a secondary component carrier feed during either of intraband contiguous or intraband non-contiguous carrier aggregation with the first receive sub-band feed for the first RF band provided from the first duplexer.

The embodiments may further include a third duplexer operatively coupled to a third output of the first band switch. The third duplexer is operative to provide a transmit sub-band feed and a receive sub-band feed for a third RF band. The embodiments may further include a fourth duplexer operatively coupled to a third output of the second band switch. The fourth duplexer is operative to provide a transmit sub-band feed and a receive sub-band feed for a fourth RF band. The embodiments may further include an RF band feed for a fifth RF band operatively coupled to a fourth output of the second band switch.

One disclosed method of operating a disclosed apparatus includes: switching, using a first band switch, a first antenna to a duplexer for a first RF band and using the first RF band as a primary component carrier; and switching, using a second band switch, a second antenna to an antenna matching network for a second RF band, at the output of the second band switch, and using the second RF band as a secondary component carrier in interband carrier aggregation with a receive sub-band of the first RF band from a receive path of the duplexer.

Another disclosed method of operating a disclosed apparatus includes: switching, using a first band switch, a first antenna to a first duplexer to provide a transmit sub-band feed and a first receive sub-band feed for a first RF band used as a primary component carrier; and switching, using a second band switch, a second antenna to one of a first antenna matching network or a second antenna matching network such that one of a second receive sub-band feed for the first RF band, or a second receive sub-band feed for a second RF band, is used as a secondary component carrier feed during carrier aggregation with the first receive sub-band feed for the first RF band provided from the first duplexer.

The disclosed method may further include: switching, using the second band switch, the second antenna to the second antenna matching network such that the second receive sub-band feed for the second RF band, is used as a secondary component carrier feed during interband carrier aggregation with the first receive sub-band feed for the first RF band provided from the first duplexer. The disclosed method may further include switching, using the second band switch, the second antenna to the first antenna matching network such that the second receive sub-band feed for the first RF band is used as a secondary component carrier feed during either of intraband contiguous or intraband non-contiguous carrier aggregation with the first receive sub-band feed for the first RF band provided from the first duplexer.

The term "feed" as used herein refers to transmission lines such as, but not limited to, microstrip lines or wire lines, or transmission lines of any type in combination with any connectors or discrete circuit elements (such as resistors, capacitors, inductors, etc.) used to form a path between components. The term "path" as used herein may refer to operative coupling used to form a circuit which may include single or multiple feeds as well as any intervening components used to form the path. The term "component" as used herein refers to antenna matching networks (which may be constructed of microstrip elements, discrete circuit elements, etc.), band switches, duplexers, PAs, LNAs, bandpass filters, processors, ASICs, DSPs, FPGAs, or the like, etc.

Figure 3:
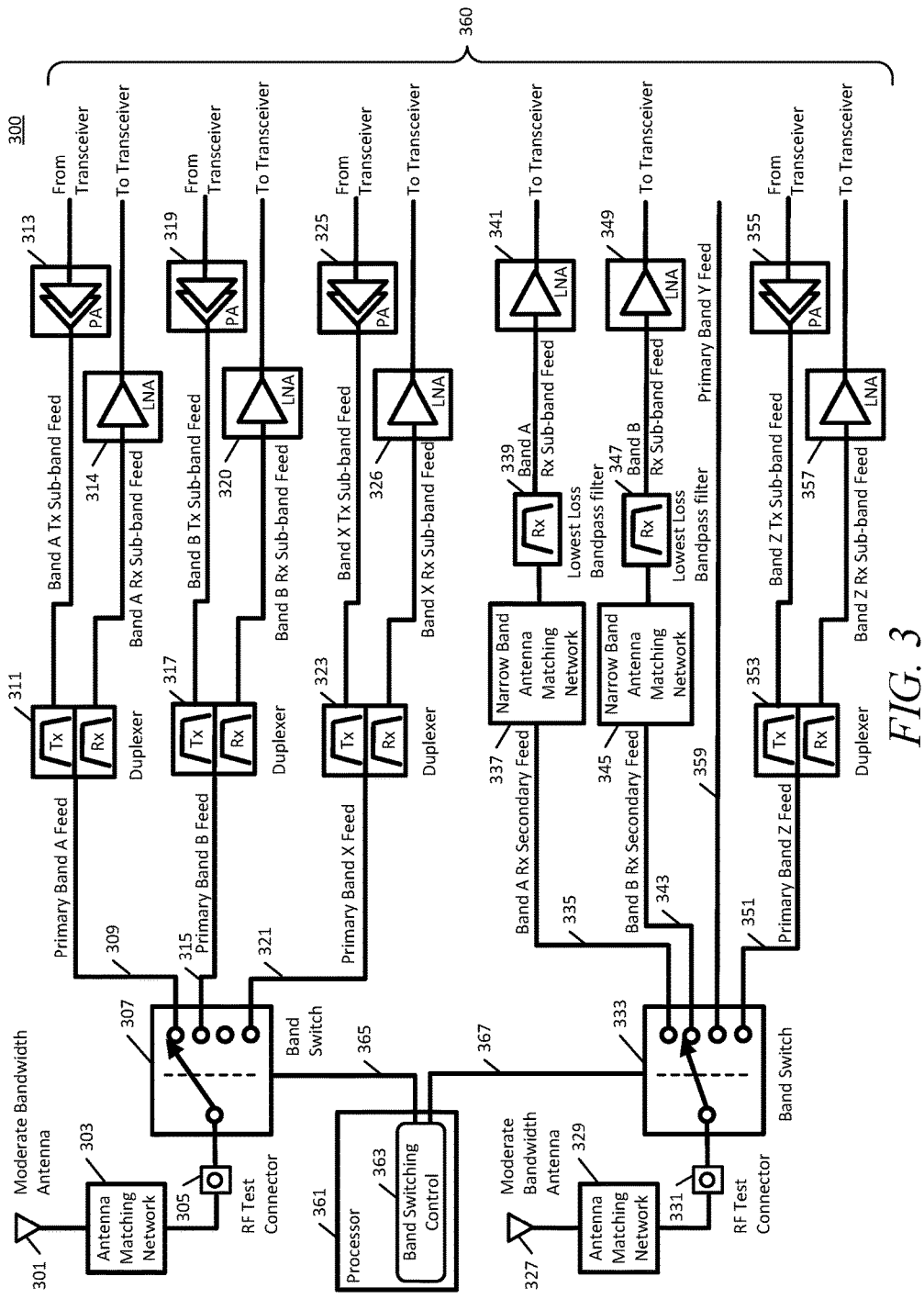
FIG. 3 is block diagram of a two antenna system and corresponding transceiver front end in accordance with the embodiments.

Turning now to FIG. 3, a block diagram of a two antenna system 300 having a corresponding transceiver front end in accordance with the embodiments is shown. A moderate bandwidth first antenna 301 has a corresponding antenna matching network 303 on the antenna feed and is operatively coupled to a first band switch 307 through an RF test connector 305. The first band switch 307 is operative to switch the first antenna 301 to primary band A feed 309, primary band B feed 315, and primary band X feed 321. A moderate bandwidth second antenna 327 has a corresponding antenna matching network 329 on the antenna feed and is operatively coupled to a second band switch 333 through an RF test connector 331. The second band switch 333 is operative to switch the second antenna 327 to band A Rx secondary feed 335, band B Rx secondary feed 343, and primary band Z feed 351. A processor 361 implements band switching control logic 363 and is operatively coupled to the first band switch 307 by control lines 365, and to the second band switch 333 by control lines 367. For LTE-Advanced operation, one of primary band A or primary band B is used as a PCC (Tx and Rx) with a secondary feed from the second antenna 327 provided as an SCC Rx path using band B Rx secondary feed 343 or band A Rx secondary feed 335, respectively.

The primary band A feed 309 is coupled to a first duplexer 311, which is in turn coupled to a PA 313 and an LNA 314 for the corresponding respective Tx and Rx connections for band A. The primary band B feed 315 is coupled to second duplexer 317, which is in turn coupled to a PA 319 and an LNA 320 for the corresponding respective Tx and Rx connections for band B. The primary band X feed 321 is coupled to a third duplexer 323, which is in turn coupled to a PA 325 and an LNA 326 for the corresponding respective Tx and Rx connections for band X.

For the second antenna 327 transceiver front end, the band A Rx secondary feed 335 is coupled to a narrow band antenna matching network 337 which is turn coupled to a low loss bandpass filter 339 (i.e. a "gentle" filter), which is in turn coupled to an LNA 341. Similarly, the band B Rx secondary feed 343 is coupled to a narrow band antenna matching network 345 which is turn coupled to a low loss bandpass filter 347 (i.e. a second gentle filter), which is in turn coupled to an LNA 349. The second band switch 333 may also switch to the primary band Y feed 359. The primary band Z feed 351 is coupled to a fourth duplexer 353, which is in turn coupled to a PA 355 and an LNA 357 for the corresponding respective Tx and Rx connections for band Z. All of the PAs and LNAs are operatively coupled to a transceiver 360.

Figure 2:
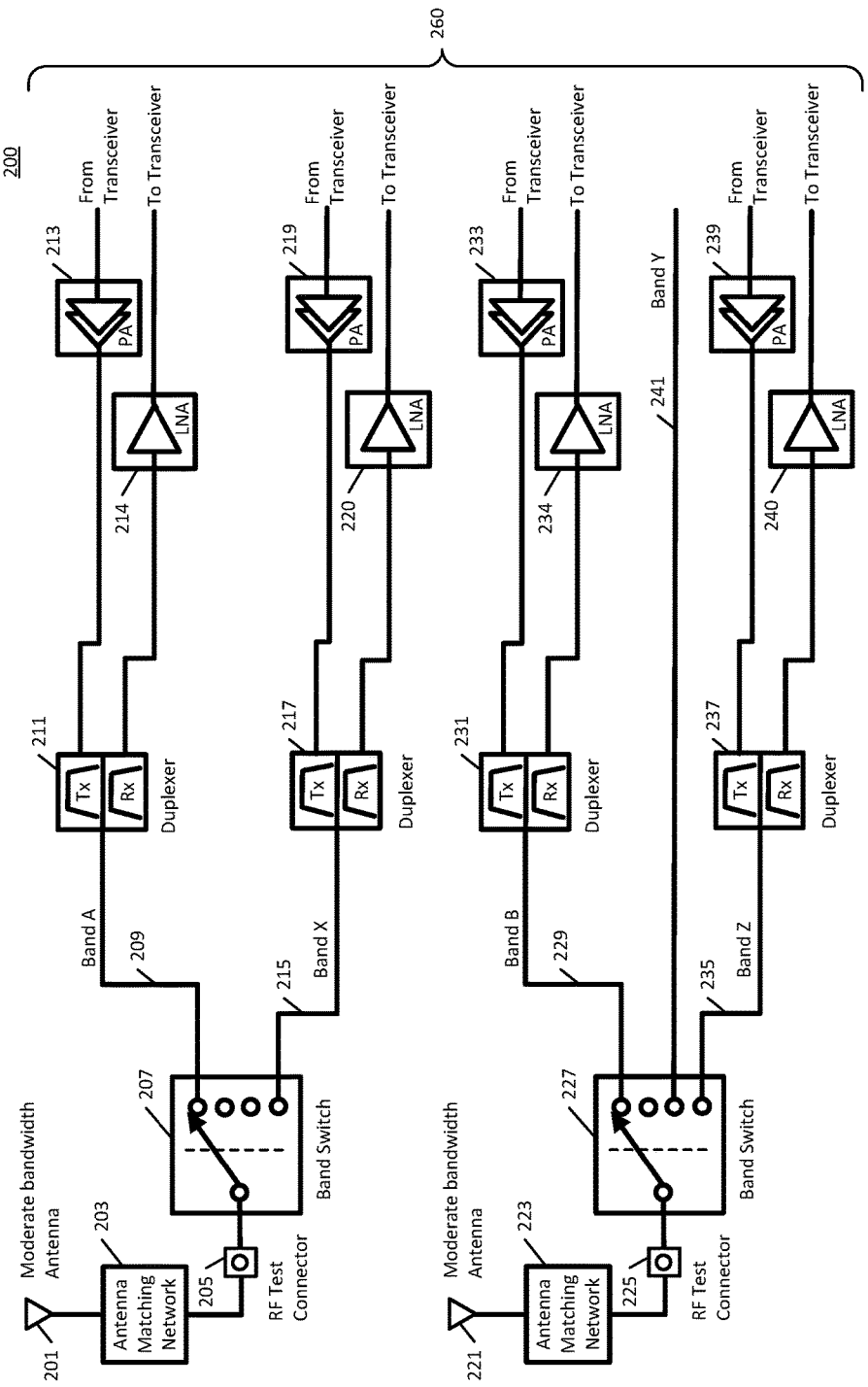
FIG. 2 is block diagram of a known two antenna system having a corresponding transceiver front end that uses two moderate bandwidth antennas where each antenna has its own dedicated antenna matching network.

In the two antenna system 300 example embodiment, the bandwidth requirements on the second antenna 327 are reduced with respect to the FIG. 2 example, because only the bandwidth for the Rx sub-band is required for the second antenna 327 when in CA operation. From an antenna design standpoint, although the physical antenna structure of the second antenna 327 may not naturally support the bandwidth necessary to implement full band support, with a narrow band antenna matching network, enough bandwidth can be achieved to support an Rx sub-band. The approach exemplified by the two antenna system 300 therefore may also allow utilization of antenna designs that would have otherwise been excluded because of high VSWR (voltage standing wave ratio). In contrast, in the FIG. 2 example both the first antenna 201 and the second antenna 221 support the full Tx and Rx sub-bands and use respective antenna matching networks at the antenna feeds and therefore antenna designs having higher VSWR could not be applied is this configuration.

In the two antenna system 300, the antenna matching networks for the secondary Rx feeds are not located at the antenna feed as in either of the FIG. 1 or FIG. 2 examples, but are instead placed after the RF test connector 331 and second band switch 333. In other words, the narrow band antenna matching network 337 and narrow band antenna matching network 345 are each coupled to the outputs of second band switch 333 rather than being coupled to the second antenna 327 feed. As shown in FIG. 3, the first band switch 307 and the second band switch 333 may each be single-pole multi-throw switches where some of the ports are dedicated for primary bands of operation and other ports for alternate bands.

Because transformation of the physical antenna impedance for the second antenna 327 is caused by various components such as the RF test connector 331, the second band switch 333, and any transmissions lines that make up the antenna feed as well as the band A Rx secondary feed 335 and the band B Rx secondary feed 343, etc., the second antenna 327 can be specifically matched to each of the secondary feed Rx bandpass filters 339, 337 by using the respective, dedicated unique narrow band antenna matching network 337 and narrow band antenna matching network 345 at the corresponding output of the second band switch 333. By matching the second antenna 327 impedance for these secondary feeds at the outputs of the second band switch 333, second antenna 327 tuning for the primary bands of operation would not be affected. Therefore the design approach used in the two antenna system 300 does not require a complex antenna tuning network at the second antenna 327 feed.

The narrow band antenna matching networks 337, 345 may be fixed or variable through the use of a tunable network in some embodiments. In one example embodiment, the antenna matching networks 337, 345 are fixed. However in other embodiments, a two state or more antenna matching network could be used where the tuning can be adjusted so that a known impedance can be presented at the RF test connector 331, for the purpose of testing and calibration of the path loss to the transceiver 360 for the band A Rx secondary feed 335 and for the band B Rx secondary feed 343. In embodiments using fixed antenna matching networks, a power offset could be applied to a test signal during calibration where the test signal is based on the known mismatch between the second antenna 327 impedance and the system test impedance.

Among other advantages, the dedicated Rx secondary feeds 335, 343 do not require any diplexing of duplex filters (i.e. quadplexing) as in the example of FIG. 1, and do not require duplexing with a Tx filter in the example of FIG. 2. Therefore, the overall path loss in the transceiver front end section for the second antenna 327 is reduced compared to the primary Rx path on first antenna 301 for that band. Additionally, the replacement of the quadplexer with lower cost duplexers and Rx-only bandpass filters enables a cost reduction over the example of FIG. 1.

As can be seen in FIG. 3, the two antenna system 300 supports intraband contiguous, as well as intraband and interband non-contiguous CA operation. For example in contiguous or non-contiguous intraband CA operation, primary band A may be used as a PCC on first antenna 301 while the band A Rx secondary path may be used as an SCC on the second antenna 327 (or primary band B as PCC on first antenna 301 and the band B Rx secondary path as SCC). In an example of interband non-contiguous CA operation as shown by the band switch positions shown in FIG. 3, primary band A may be used as a PCC on first antenna 301 while the band B Rx secondary path may be used as an SCC on the second antenna 327 (or primary band B as PCC on first antenna 301 and the band A Rx secondary path as SCC).

The band switching control logic 363 may be implemented in various ways in the embodiments. For example, in one example embodiment, the band switching control logic 363 may be implemented as executable instructions executed by one or more processors such as processor 361 or a separate processor that is operatively coupled to the processor 361. In other embodiments, the band switching control logic 363 may be implemented as hardware or as a combination of hardware and software/firmware. In embodiments implemented as software, or partially in software/firmware, the executable instructions may be stored in operatively coupled, non-volatile, non-transitory memory (not shown), that may be accessed by the one or more processors, such as processor 361, as needed. The memory may be operatively coupled to the one or more processors, may be integrated therewith, or may be some combination of operatively coupled memory and integrated memory.

It is therefore to be understood that the band switching control logic 363 may be implemented as software or firmware (or a combination of software and firmware) executing on one or more processors, or using an ASIC (application-specific-integrated-circuit), DSP (digital signal processors), hardwired circuitry (logic circuitry), state machines, an FPGA (field programmable gate array) or combinations thereof. Therefore, the example apparatus illustrated in FIG. 3 and described herein provides an example embodiment and is not to be construed as a limitation on the various other possible implementations that may be used in accordance with the various embodiments.

More particularly, in some embodiments the band switching control logic 363 shown in FIG. 3 may be an ASIC or FPGA operatively coupled to the first band switch 307 and to the second band switch 333 using a GPIO (general purpose input/output) interface, SPI (serial peripheral interface), MIPI-compatible (Mobile Industry Processor Interface) or some other appropriate chip-to-chip communication interface. In other words, control lines 365 and control lines 367 may be implemented as GPIO, SPI, MIPI-compatible or other interfaces, etc. in the various embodiments.

Figure 4:
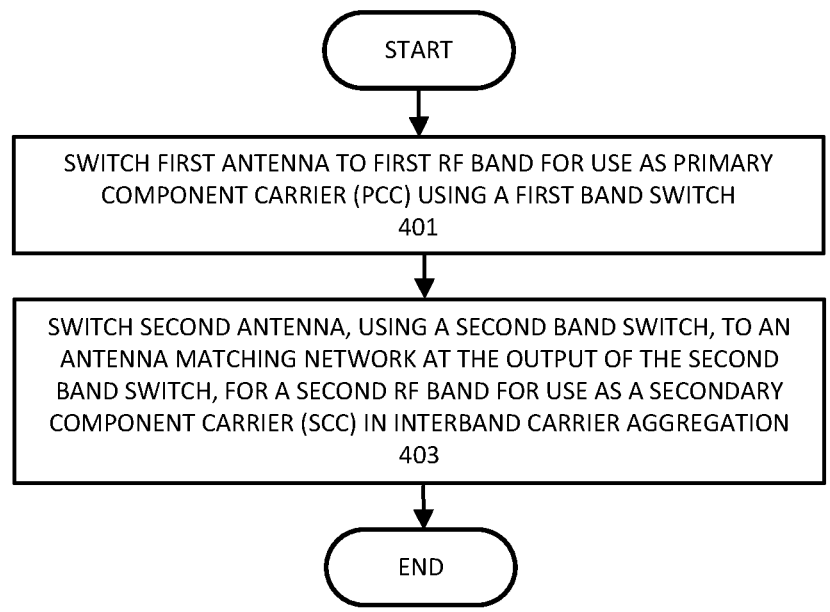
FIG. 4 is a flow chart showing operation of a two antenna system and corresponding transceiver front end in accordance with various embodiments.
Figure 5:
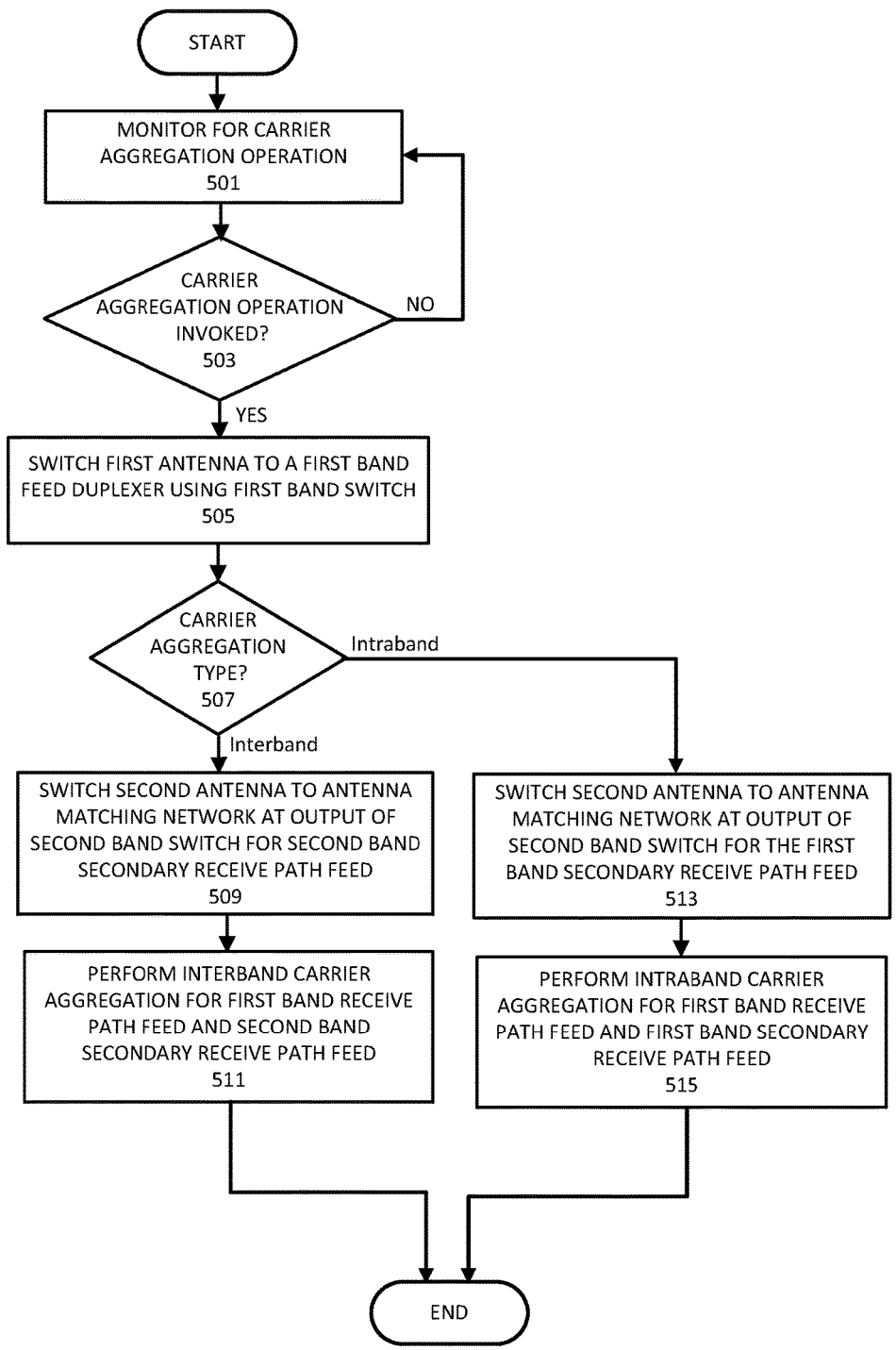
FIG. 5 is a flow chart showing operation of a two antenna system and corresponding transceiver front end in accordance with various embodiments.

Example methods of operation of the two antenna system 300 are provided in FIG. 4 and FIG. 5. Beginning with the example of FIG. 4, in operation block 401 the band switching control logic 363 controls the first band switch 307 to switch the first antenna 301 to a first RF band for use as a PCC during carrier aggregation operation. Either the primary band A feed 309 or the primary band B feed 315 may be selected as a PCC. The band selected for the PCC depends, for example, on the serving base station spectrum and corresponding channels assignments received by the transceiver 360. In operation block 403, the band switching control logic 363 controls the second band switch 333 to switch the second antenna 327 to the appropriate narrow band antenna matching network for a second RF band for interband carrier aggregation. In other words, if band A is selected for the PCC, then band B will be selected as the SCC. Likewise if band B is selected for the PCC, then band A will be selected as the SCC. The method of operation then terminates as shown.

Further details of operation are provided in FIG. 5. In operation block 501, the two antenna system 300 monitors for invocation of carrier aggregation operation. The decision to invoke carrier aggregation may depend on mode of operation of a device that incorporates the two antenna system 300, available base station spectrum, RF conditions, or other factors, etc. The processor 361 may be the component responsible for operation block 501 in some embodiments, however the decision may be sent to processor 361 from other processing components (not shown) or from the transceiver 360 in some embodiments. If carrier operation is not invoked in decision block 503, then the two antenna system 300 continues to monitor in operation block 501.

If carrier operation is invoked in decision block 503, then in operation block 505, the band switching control logic 363 switches the first antenna 301, using the first band switch 307, to a first band feed duplexer such as first duplexer 311 for band A or second duplexer 317 for band B. In decision block 507, the band switching control logic 363 will control the second band switch 333 to switch the second antenna 327 to either the band A Rx secondary feed 335 or the band B Rx secondary feed 343 depending on whether interband or intraband carrier aggregation is to be used.

If interband carrier aggregation is to be used, then the method of operation proceeds to operation block 509 and the band switching control logic 363 switches the second antenna 327 to the narrow band antenna matching network of a second band secondary receive feed. In other words, if band A is selected for the PCC in operation block 505, then band B will be selected as the SCC in operation block 509. Likewise if band B is selected for the PCC in operation block 505, then band A will be selected as the SCC in operation block 509. In operation block 511, the transceiver 360 may then perform interband carrier aggregation and the method of operation then terminates as shown.

If intraband carrier aggregation is to be used, then the method of operation proceeds to operation block 513 and the band switching control logic 363 switches the second antenna 327 to the narrow band antenna matching network of a same band secondary receive feed. In other words, if band A is selected for the PCC in operation block 505, then band A will be selected as the SCC in operation block 513. Likewise if band B is selected for the PCC in operation block 505, then band B will be selected as the SCC in operation block 513. In operation block 515, the transceiver 360 may then perform intraband carrier aggregation and the method of operation then terminates as shown.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus comprising:
a first antenna, operatively coupled to an input of a first band switch;
a first duplexer operatively coupled to a first output of the first band switch, the first duplexer operative to provide a transmit sub-band feed and a first receive sub-band feeds for a first RF band;
a second duplexer operatively coupled to a second output of the first band switch, the second duplexer operative to provide a transmit sub-band feed and a first receive sub-band feed for a second RF band;
a second antenna, operatively coupled to an input of a second band switch;
a first antenna matching network for the second antenna, operatively coupled to a first output of the second band switch, the first antenna matching network output operative to provide a second receive sub-band feed for the first RF band; and
a second antenna matching network for the second antenna, operatively coupled to a second output of the second band switch, the second antenna matching network output operative to provide a second receive sub-band feed for the second RF band.

2. The apparatus of claim 1, further comprising:
a first bandpass filter operatively coupled to the first antenna matching network output, the first bandpass filter tuned to the receive sub-band of the first RF band; and
a second bandpass filter operatively coupled to the second antenna matching network output, the second bandpass filter tuned to the receive sub-band of the second RF band.

3. The apparatus of claim 1, further comprising:
band switching control logic, operatively coupled to the first band switch and to the second band switch, the band switching logic operative to:
switch, using the first band switch, the first antenna to the first duplexer such that the first RF band is used as a primary component carrier; and
switch, using the second band switch, the second antenna to one of the first antenna matching network or the second antenna matching network such that one of the second receive sub-band feed for the first RF band, or the second receive sub-band feed for the second RF band, is used as a secondary component carrier feed during carrier aggregation with the first receive sub-band feed for the first RF band provided from the first duplexer.

4. The apparatus of claim 1, further comprising:
band switching control logic, operatively coupled to the first band switch and to the second band switch, the band switching logic operative to:
switch, using the first band switch, the first antenna to the first duplexer such that the first RF band is used as a primary component carrier; and
switch, using the second band switch, the second antenna to the second antenna matching network such that the second receive sub-band feed for the second RF band, is used as a secondary component carrier feed during interband carrier aggregation with the first receive sub-band feed for the first RF band provided from the first duplexer.

5. The apparatus of claim 1, further comprising:
band switching control logic, operatively coupled to the first band switch and to the second band switch, the band switching logic operative to:
switch, using the first band switch, the first antenna to the first duplexer such that the first RF band is used as a primary component carrier; and
switch, using the second band switch, the second antenna to the first antenna matching network such that the second receive sub-band feed for the first RF band is used as a secondary component carrier feed during either of intraband contiguous or intraband non-contiguous carrier aggregation with the first receive sub-band feed for the first RF band provided from the first duplexer.

6. The apparatus of claim 1, further comprising:
a third duplexer operatively coupled to a third output of the first band switch, the third duplexer operative to provide a transmit sub-band feed and a receive sub-band feed for a third RF band.

7. The apparatus of claim 1, further comprising:
a third duplexer operatively coupled to a third output of the second band switch, the third duplexer operative to provide a transmit sub-band feed and a receive sub-band feed for a third RF band.

8. The apparatus of claim 6, further comprising:
a fourth duplexer operatively coupled to a third output of the second band switch, the fourth duplexer operative to provide a transmit sub-band feed and a receive sub-band feed for a fourth RF band.

9. The apparatus of claim 8, further comprising:
an RF band feed for a fifth RF band operatively coupled to a fourth output of the second band switch.

10. A method, comprising:
switching, using a first band switch, a first antenna to a duplexer for a first RF (radio frequency) band and using the first RF band as a primary component carrier; and
switching, using a second band switch, a second antenna to an antenna matching network for a second RF band, at the output of the second band switch, and using the second RF band as a secondary component carrier in interband carrier aggregation with a receive sub-band of the first RF band from a receive path of the duplexer.

11. A method, comprising:
switching, using a first band switch, a first antenna to a first duplexer to provide a transmit sub-band feed and a first receive sub-band feed for a first RF band used as a primary component carrier; and
switching, using a second band switch, a second antenna to one of a first antenna matching network or a second antenna matching network such that one of a second receive sub-band feed for the first RF band, or a second receive sub-band feed for a second RF band, is used as a secondary component carrier feed during carrier aggregation with the first receive sub-band feed for the first RF band provided from the first duplexer.

12. The method of claim 11, further comprising:
switching, using the second band switch, the second antenna to the second antenna matching network such that the second receive sub-band feed for the second RF band, is used as a secondary component carrier feed during interband carrier aggregation with the first receive sub-band feed for the first RF band provided from the first duplexer.

13. The method of claim 11, further comprising:
switching, using the second band switch, the second antenna to the first antenna matching network such that the second receive sub-band feed for the first RF band is used as a secondary component carrier feed during either of intraband contiguous or intraband non-contiguous carrier aggregation with the first receive sub-band feed for the first RF band provided from the first duplexer.

* * * * *